United States Patent [19]

Freeman et al.

[11] Patent Number: 4,870,328
[45] Date of Patent: Sep. 26, 1989

[54] COLOR DISPLAY SYSTEM

[75] Inventors: Kenneth G. Freeman, Reigate; David S. George, Haywards Heath; Alan G. Knapp, Crawley, all of England

[73] Assignee: U.S. Philips Corporation, New York, N.Y.

[21] Appl. No.: 289,492

[22] Filed: Dec. 20, 1988

Related U.S. Application Data

[63] Continuation of Ser. No. 32,419, Mar. 30, 1987, abandoned.

[30] Foreign Application Priority Data

Apr. 1, 1986 [GB] United Kingdom ............... 8607963

[51] Int. Cl.⁴ ............................................. H01J 43/00
[52] U.S. Cl. ............................ 315/366; 313/105 CM; 313/534
[58] Field of Search ................... 315/366; 313/103 R, 313/103 CM, 104, 105 R, 105 CM, 422, 528, 533, 534, 535, 536; 250/207; 328/243; 307/270

[56] References Cited

U.S. PATENT DOCUMENTS

| | | | |
|---|---|---|---|
| 2,821,637 | 1/1958 | Roberts et al. | 313/528 |
| 4,467,224 | 8/1984 | Maddox | 307/270 |
| 4,560,898 | 12/1985 | Knapp et al. | 313/400 |
| 4,667,134 | 5/1987 | Terry | 315/366 |

Primary Examiner—Robert L. Griffin
Assistant Examiner—Ted Salindong
Attorney, Agent, or Firm—Edward W. Goodman

[57] ABSTRACT

A color display system including a cathode ray display tube (10) of the kind which has an electron multiplier (16) arranged adjacent a luminescent screen (14) comprising a repeating pattern of three different color phosphor elements and pairs of color selection electrodes (38, 40) associated with each channel of the multiplier operable to control the direction of the electron beam from the channels for color selection purposes uses a switching bridge circuit comprising semiconductor switching device (52, 54, 56, 58), e.g. MOSFETs, connected between voltage supplies for switching the voltage applied to each one of the pair of electrodes between three respective levels in synchronism to achieve a predetermined color selection sequence. The semiconductor devices are controlled by synchronized waveforms from a pulse generating circuit (86) via optocouplers (88) enabling the switching bridge circuit to be floated at a high potential. The switching voltages applied to one of the selection electrodes may be offset with respect to those applied to the other electrode.

12 Claims, 5 Drawing Sheets

COLOR DISPLAY SYSTEM

BACKGROUND OF THE INVENTION

This invention relates to a color display system comprising a color display tube having a channel plate electron multiplier adjacent to a luminescent screen, the screen comprising a repeating pattern of three phosphor elements for luminescing in different colors respectively, means for scanning an electron beam across an input face of the electron multiplier to provide electron input thereto, a pair of color selection electrodes associated with each channel of the multiplier and disposed between an output face of the electron multiplier and the luminescent screen, which are operable to deflect the electron beam existing from the channels of the electron multiplier and by appropriate control of which the electron beam can be directed selectively onto each of the plurality of phosphor elements, and circuit means connected to the color selection electrodes for switching the voltage applied to the pairs of color selection electrodes between three voltage levels.

An example of such a color display system is described in published British patent application GB No. 2124017A. The pair of color selection electrodes for each channel of the electron multiplier are arranged on opposite sides of the channel axis, adjacent a coaxial aperture in an apertured extractor electrode mounted on, and insulated from, the output face of the electron multiplier which draws the electrons out of the channel. The electrodes of each pair are electrically insulated from one another and by suitably addressing the electrodes, the electron beam exiting from the aperture in the extractor electrode can be deflected to one side or the other so as to impinge upon respective ones of the plurality of phosphor elements of a repeating vertical stripe pattern to display selectively first and second colors, namely red and blue. In the undeflected state, that is with no potentials or the same potentials applied to the pairs of electrodes, the electron beam is directed onto the third phosphor element of the repeating pattern to display green. As described in the aforementioned patent application, each pair of electrodes associated with each channel is formed separate so that two electrodes are provided between adjacent channel outputs in a row, one forming part of the electrode pair associated with one channel and the other forming part of the electrode pair associated with the adjacent channel, with the respective first and second electrodes of all pairs being electrically interconnected. The multiplier channels are aligned rectilinearly in columns and respective first and second electrodes of the electrode pairs associated with each column of channels are interconnected. Alternatively, however, a single, shared, electrode may be provided between adjacent channel outputs, this electrode serving as one electrode of each of the electrode pairs associated with the adjacent channels. In this case, columns of electrodes are interconnected and alternate electrodes in a row are interconnected with alternate columns of electrodes being switched oppositely and the pattern of phosphor elements of the screen arranged accordingly. In either event, the interconnected pairs of color selection electrodes exhibit a capacitance effect during operation.

This display apparatus enables therefore a color picture to be produced using a single electron beam which is scanned in raster fashion over the input face of the electron multiplier, the required line and field scan deflectors operating on the beam prior to reaching the electron multiplier.

The display apparatus may be used in order to display television pictures according to a conventional standard scanning format, for example the PAL standard of 625 lines, 2:1 interlace, 50 Hz field format where the input red, green and blue signals are derived from an RGB source such as a camera, telecine or from a PAL decoder.

There is described in British patent application No. 8524547 a preferred mode of operating this display system which involves scanning each picture line of the standard TV signal three times during the normal 64 $\mu$s, line scan period. The red, green and blue video components, having been stored in suitable line memories, are read out separately in succession at three times the usual video signal rate with the switching circuit operating to switch the color selection electrodes to display in turn the three color components of each standard picture line separately and successively during the standard line period. The color selection sequence may either be continuous, i.e. of the form RGBRGB ... or reversing, i.e. of the form RGBBGRRGB ... This mode of operation requires, in addition to a 15 MHz video amplifier and a 46.8 kHz line scan, six line stores, (two for each color) and, because also the color selection electrodes exhibit a capacitance effect, a three-level color selection electrode voltage switching circuit capable of charging the selection electrode capacitance to the requisite voltage levels in 1 or 2 microseconds. Test so far indicate that for a 300 mm screen diagonal tube this capacitance is likely to be in the range 10 to 100 nF and the required deflection voltage for the "outer" colors in the order of 100 volts. Thus the deflection electrode capacitance must be successively charged to levels of the order of $+100$, 0, and $-100$ volts in only 1 or 2 microseconds, a process requiring charging current pulses of many amps.

In operation of the tube, the extractor electrode adjacent the final dynode of the electron multiplier, and over which the deflection electrodes are disposed, is held at, for example, 2.25 kV while the screen electrode is held at around 10 kV with respect to a cathode potential of 0 V. The color selection electrodes are in this case maintained at a mean potential of, for example, 2.5 kV with the net switching voltages of, say, $+100$ V, and $-100$ V necessary to deflect the electron beam to the respective two "outer" phosphor stripes being superimposed around this mean potential. If the color selection electrodes are correctly aligned with the phosphor screen structure then the switching (deflection) voltages can be symmetrically arranged about the mean potential. However, it is a requirement that if the color selection electrodes and phosphor screen structure are not correctly aligned it should nevertheless be possible to get correct color phosphor excitation by asymmetric disposal of these switching voltages about the mean voltage.

SUMMARY OF THE INVENTION

It is an object of the present invention to provide a color display system of the aforementioned kind having a color selection electrode switching circuit capable of achieving these requirements in a simple and reliable manner.

According to the present invention, there is provided a color display system as mentioned in the opening paragraph which is characterized in that the circuit means comprises a switching bridge circuit having two sets of two series-connected controlled semiconductor switching devices with a first end of each set connected to a source at a respective first voltage constituting the first voltage level and a second end of each set connected to a source at a respective second voltage constituting a second voltage level and with each set having an output intermediate the two semiconductor switching devices thereof connected to a respective one of the pairs of color selection electrodes, means for returning the voltages on the color selection electrodes to a respective intermediate, third, voltage level of a third source, and signal generating means having outputs connected to the controlling electrodes of the semiconductor switching devices of both sets for controlling switching of the devices, and hence the voltage applied to the pairs of selection electrodes, in a predetermined sequence.

The circuit means enables the required high speed switching of the large capacitance exhibited by the color selection electrodes over a comparatively large voltage to be achieved accurately and in a reliable and simple manner. Moreover, the circuit means is capable of driving without adverse operational effect a small series inductive load such as, for example, that caused by the presence of leads electrically coupling the circuit means with the color selection electrodes.

The semiconductor switching devices may comprise field effect transistors. In this case, the switching devices of each set may comprise an n-channel and a p-channel MOSFET whose sources are connected respectively to the respective first and second voltage sources and whose drains are connected to the output, with the waveforms of the signals supplied by the signal generating means to the control electrodes of the switching devices of one set being the inverse of the waveforms supplied to the control electrodes of the switching devices of the other set. Alternatively, bipolar transistors may be used and the aforementioned n-channel and p-channel MOSFETs of the switching bridge circuit replaced respectively by npn and pnp bipolar transistors. In both cases, the arrangement ensures that the voltages on each one of the pair of color selection electrodes are switched in synchronism. The respective voltage switching sequences of the electrodes, as dictated by the controlling waveforms from the signal generating means, conveniently are in opposite senses, so that, for example, as one electrode is switched from its second voltage level through its third, intermediate, voltage level to its first voltage level the other electrode is switched from its first voltage level, through its third, intermediate, voltage level to its second voltage level.

The output of each set of the switching bridge circuit may be connected also to the third source at the respective intermediate, third, voltage level via at least one further controlled semiconductor switching device whose control electrode is connected to a further output of the signal generating means, the waveform of the signal supplied to the control electrode of the said at least one further switching device associated with one set being synchronized with the waveform supplied to the control electrode of the at least one further switching device of the other set whereby the electrodes of each pair of color selection electrodes are brought simultaneously to their respective third voltage level. This arrangement provides a simple yet effective means for returning the voltages on the color selection electrodes to a respective intermediate value.

In a preferred embodiment, the output of each set of the switching bridge circuit is connected to the respective intermediate voltage source via an n-channel and a p-channel MOSFET connected in parallel whose control electrodes are connected to respective outputs of the signal generating means with the signal waveform supplied to one control electrode being the inverse of the signal waveform supplied to the other control electrode. The complementary connection of two pairs of n-channel and p-channel MOSFETs to the associated intermediate voltage source in this way ensure correct discharge of the deflector electrode capacitance to this intermediate voltage level from either direction. In order to counteract the adverse effect of the inrinsic MOSFET reverse drain-source diodes, a respective diode is connected between each of the parallel connected MOSFETs and the output of the respective set.

If the color selection electrodes, and accordingly the multiplier channels, are correctly aligned with the stripes of the phosphor screen, then conveniently the same first, second and third voltage sources may be shared by the two sets of semiconductor switching devices. As a result, the first and second switching voltages applied to the color selection electrodes may be arranged symmetrically about the intermediate, mean, voltage level. However, the first, second and third voltage sources associated with one set of the semiconductor switching devices may be separate from those associated with the other set and the respective voltage sources associated with both sets may be interconnected through a statically shifting variable voltage source providing an offset voltage to the voltage sources associated with one set. By varying the voltage offset, misalignment between the groups of phosphor stripes and their associated color selection electrodes can be accommodated. In effect, a steady DC voltage can be applied between the electrodes, if necessary, so that the switching voltages applied to the electrodes are asymmetrically disposed about their mean voltage resulting in an overall bias deflection to the electron beam from the multiplier's channel which ensures correct color phosphor excitation.

The outputs of the signal generating means may be connected to the control electrodes of the switching devices of the switching bridge circuit via optocouplers. This readily enables control electrode drive waveforms to be at different levels relative to one another and at a high potential relative to ground. In effect, the switching circuit floats by a high voltage, typically 2.5 kV, relative to ground, this potential being necessary in view of the high, final, potential of the extractor electrode disposed over the output of the channel electron multiplier.

In a preferred embodiment, the circuit means is arranged, by suitably configuring the signal waveforms from the signal generating means, to switch the voltage applied to each one of the pair of selection electrodes between their respective three voltage level in the sequence 1, 2, 3, 2, 1, 2, 3 ... and so on where 1, 2 and 3 respectively designate the first voltage, the intermediate voltage, and the second voltage with the 1 and 3 voltage periods being double the 2 voltage period. This sequence corresponds to the aforementioned reversing color selection sequence, i.e. RGBBGRRGB ... and so on. Assuming that the first and second voltages are positive $(+V/2)$ and negative $(-V/2)$ respectively, and symmetrical, with respect to the intermediate (mean) voltage (0 V), it can be shown that the energy lost for each switching transition between the intermediate voltage and the first or second voltage, and vice versa, is ($\frac{1}{2}$) $CV^2$ joules, where C is the capacitance of the pairs of selection electrodes, while for a transition between the first and second voltages, and vice versa, it is 2 $CV^2$. Hence it can be shown that the powers required for a continuous color selection sequence, i.e. RGBRGB ... resulting from a voltage level switching sequence 1,2,3,1,2,3, ... involving switching directly from states 3 to 1, and for a reversing color selection sequence are given by 3 $fCV^2$ and $fCV^2$ respectively where f is the original PAL line frequency. Thus the reversing color selection sequence is considerably more economical in power requirement.

BRIEF DESCRIPTION OF THE DRAWINGS

A color display system in accordance with the present invention will now be described, by way of example, with reference to the accompanying drawings in which.

DETAILED DESCRIPTION OF THE INVENTION

Figure 1:
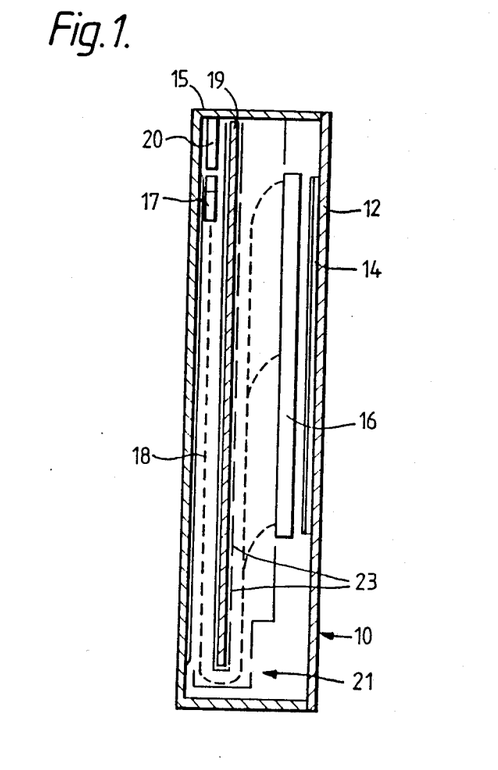
FIG. 1 is a diagrammatic elevation through the display tube of the system, the particular form of tube shown being a so-called flat display tube.

With reference to FIG. 1, the flat color display tube 10 comprises a rectangular envelope 15 having a substantially flat faceplate 12. On the faceplate 12 there is provided a phosphor screen 14 comprising a pattern of repeating groups of red, R, green, G, and blue, B, vertically extending phosphor lines. A channel plate electron multiplier 16 is arranged parallel to, and spaced from, the faceplate 12. An electron gun 20 is disposed in the rear portion of the envelope and directs a low-energy electron beam 18 downwardly in a direction parallel to the faceplate 12 and the rear wall of the envelope 15. The beam is deflected by means of an electrostatic deflector 17 positioned near the gun 20 in a plane parallel to the faceplate 12 to effect line scanning. The line scanning beam 18 is deflected through 180' by a reversing lens 21 at the lower end of the envelope so that it travels in the opposite direction over the other side of a partition 19. The partition 19 carries a plurality of selectively energizable, vertically spaced, horizontally elongate electrodes 23. The electrodes 23 are operable to effect field scanning of the electron beam 18 over the input face of the channel plate electron multiplier 16. Having undergone electron multiplication within the multiplier 16, the beam accelerated on the phosphor screen 14 by means of an aluminium backing electrode of the screen. Thus, the line scan deflector 17 and field scan electrodes 23 serve to scan the single electron beam 18 over the screen 14 in raster fashion via the channel plate electron multiplier 16. The color display tube of FIG. 1 is similar in many respects to the tube described in published British patent application 2101396A and reference is invited to this published application for a more detailed description of the tube and its construction. An important difference however is that the tube of the aforementioned application is monochrome, having a single color phosphor screen, whereas the tube of FIG. 1 is intended for color display purposes and accordingly is provided with additional means, as will subsequently be described, for achieving this end.

Figure 2:
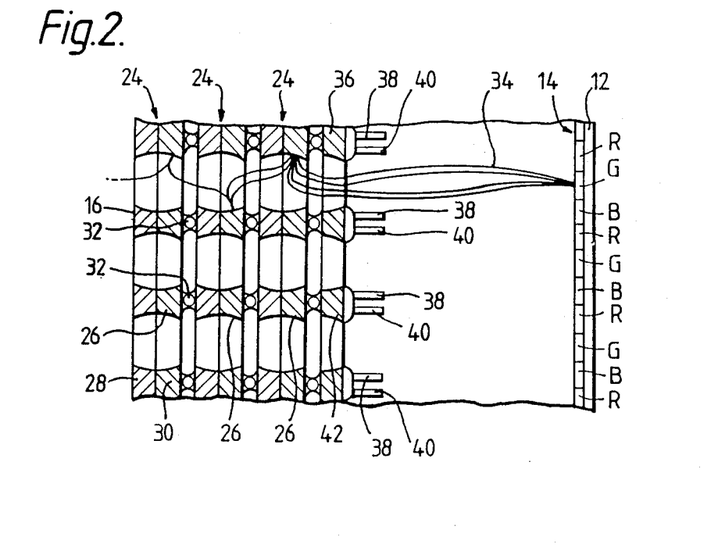
FIG. 2 is a transverse sectional view, not to scale, depicting a portion of the final three stages of a laminated channel plate electron multiplier, color selection electrodes, the screen and the faceplate of the tube of FIG. 1 viewed from above and illustrating the employed method of color selection.

The channel plate electron multiplier 16 is a laminated dynode kind of multiplier. The construction of this kind of multiplier is disclosed in a number of prior British patent specifications of which two examples are specification Nos. 1,434,053 and 2,023,332A, details of which are incorporated by way of reference. Accordingly a detailed description of its construction and operation will not be given. Briefly however, the electron multiplier 16 comprises a plurality of apertured dynodes 24 of which the last three are shown in FIG. 2. The barrel-shaped apertures 26 in successive dynodes are aligned with each other to form the channels. The dynodes 24 in fact comprise two half dynodes 28, 30 arranged back to back. Successive dynodes 24 are separated from each other by a resistive or insulating spacing means which in the illustrated embodiment comprise small glass balls 32 known as ballotini. In operation the electron beam 18 entering a channel undergoes current multiplication by secondary emission as it passes from one dynode to the next, each of which is typically 300 V more positive than the previous one. In order to extract the current multiplied electron beam 34 from the final dynode of the electro multiplier 16, an extractor electrode 36 with apertures 42 aligned with the multiplier's channels is provided. This extractor electrode 36 generally comprises a half dynode mounted on, but spaced from, the final dynode. A positive voltage, typically +100 V relative to that of the last dynode, is applied to the extractor electrode 36 which not only draws out the electron beam 34 but also focuses it.

With the illustrated arrangement of the phosphors R, G and B in the repeating groups, an undeflected, current multiplied electron beam 34 will impinge on the green phosphor G. To impinge on the red, R, and blue, B, phosphors the electron beam 34 has to be deflected to the left and to the right, respectively, (i.e. up and down respectively in FIG. 2). This deflection of the current multiplied electron beam 34 is achieved by color selection electrodes comprising pairs of electrodes 38, 40 arranged one on each side of each aperture 42 in the extractor electrode 36. The apertures 42 are aligned rectilinearly in columns and the electrodes 38, 40 are elongate, extending the height of the columns. All the electrodes 38 are interconnected as are the electrodes 40. The electrodes 38, 40 are electrically insulated from each other and from the extractor electrode 36. The color selection electrode arrangement is described in greater detail in published British patent application No. 2124017A, whose disclosure is incorporated herein by reference.

In operation, in order to deflect the electron beam 34 it is necessary to apply a potential difference between the sets of electrodes 38, 40. For example, in a situation where relative to the final dynode the extractor electrode 36 is at, say, +100 V and the screen 14 is at, say, +7 to 10 kV, then for an undeflected beam 34 a mean voltage of +250 V is applied to both the electrodes 38, 40 and in this case to obtain a deflection in one direction or the other a potential difference of, say, 100 V is produced so that for a deflection onto the red phosphor, R, the electrode 40 is at +300 V whilst the electrode 38 is at +200 V, the voltages being the opposite way around for deflection onto the blue phosphor B.

Figure 3A:
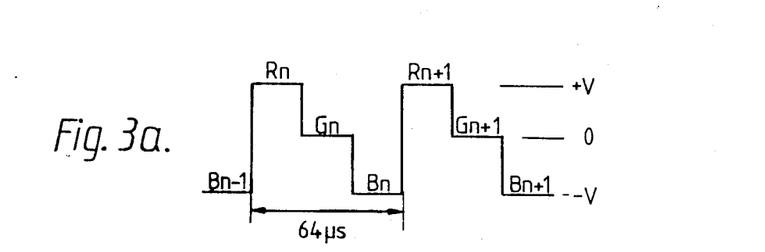
FIGS. 3a and 3b illustrate respectively alternative sequences of potentials applied to the color selection electrodes.
Figure 3B:
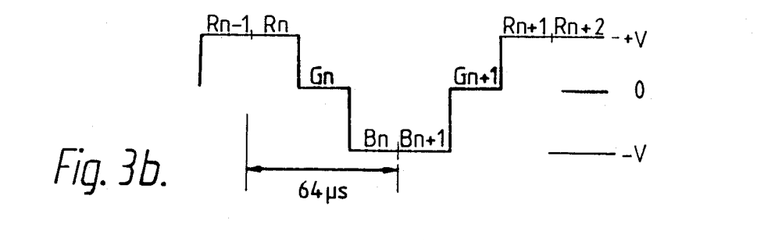

FIGS. 3a and 3b illustrates respectively the potential differences which exist between each pair of color selection electrodes 38 and 40 over a period of time according to two alternative sequences of color selection switching. In these figures R, G and B denote the color (Red, Green and Blue) which are displayed and n denotes the PAL raster line number. With regard to FIG. 3a, it is seen that for each group of three different color lines scanned, corresponding to a standard 64 μs line period, potential differences of +V exist between the electrodes 38 and 40 so that the electron beam is deflected onto a red phosphor stripe, followed by a zero potential difference allowing the beam to impinge on a green phosphor stripe followed by a potential difference of −V (that is, in the opposite sense) causing deflection of the beam onto a blue phosphor stripe. This sequence is repeated so as to give a continuous color sequence of RGBRGBRBG and so on. With regard to FIG. 3b, it will be seen that the manner of electrode switching gives rise to a reversing color sequence of RGBBGRRGBB and so on and, unlike that of FIG. 3a, avoids direct transition from for example a potential difference in one sense (+V) to a potential difference in the opposite sense (−V).

Line scan is performed at three times the normal rate, that is, three times the rate determined by the standard PAL scanning format, and the red, green and blue components of each standard PAL line are displayed in turn, separately, in the form of three respectively colored lines during the normal standard line period. In order to do this, the necessary sequential, time-compressed, color components are derived using a number of television line-stores which store a respective one of the three color components for each PAL line and which are read-out at three times the write-in rate. The color selection voltages applied to the color selection electrodes, 38 and 40, are cyclicly change line-sequentially between the three values necessary to cause the electron beam 34 emerging from the channel plate electron multiplier 16 to land on the respective red, green and blue phosphor lines of the screen 14. Either reversing or continuous color sequences may be used. As successive lines are scanned with the different color selection the appropriate red, green and blue primary signals are sequentially supplied to the electron gun 20 in synchronism.

The field scanning of the display may be accomplished by carrying out "linear" vertical scan at, for example, 50 Hz continuously while performing the line scan at the triple-PAL rate in the aforementioned manner, or alternatively, by stepping the vertical scan after every three triple-PAL rate scanning lines, that is, after each block of three separate and differently colored lines corresponding to a single PAL standard line, so that the red, green and blue components of each standard PAL line are accurately superimposed and their maximum spatial error is, in principle, zero.

This mode of operation, and a circuit by which it may be achieved, is described in British patent application No. 8524547. Thus for each standard PAL line, three separate lines are drawn on the screen in turn at three times the rate of the PAL lines, each line being in a respective color as determined by switching of the color selection electrodes 38 and 40 by a switching circuit and lasting one third of the period of the standard PAL line.

Figure 4A:
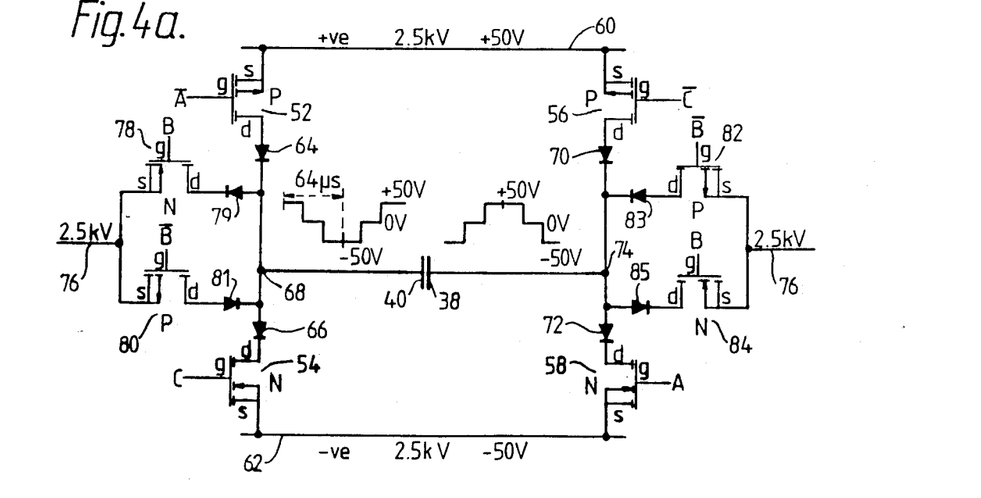
FIGS. 4a and 4b show schematically a color selection electrode switching circuit of the display system.

The color selection electrode switching circuit is shown schematically in FIG. 4a. The particular circuit shown is intended to provide a reversing color sequence operation. The circuit comprises a switching bridge circuit having two sets of two series-connected semiconductor switching devices 52 and 54, and 56 and 58 respectively connected in parallel between a common positive voltage supply source 60 and a common negative voltage supply source 62. The devices 52 and 56 are p-channel MOSFETS whose sources (s) are connected to the supply 60. The devices 54 and 58 are n-channel MOSFETS whose sources (s) are connected to the supply 62. The drains (d) of the devices 52 and 54 are connected together through respective diodes 64 and 66 as shown for protection against the effects of flash over in the tube and via an intermediate output junction 68 to the electrodes 40 of the pairs of color selection electrodes. Similarly, the drains (d) of the devices 56 and 58 are connected together through respective diodes 70 and 72 and via an intermediate output junction 74 to the electrodes 38 of the pairs of color selection electrodes. In view of their capacitive effect the electrodes 38 and 40 are represented in the figure simply as plates of a capacitor.

The output junction 68 is also connected to a supply source 76 at a voltage which is the mean of the voltages of sources 60 and 62 via an n-channel, MOSFET 78 with a diode 79 in series with its drain and a p-channel MOSFET 80 with a diode 81 in series with its drain connected in parallel. Similarly, the output junction 74 is connected to the same supply source 76 via parallel connected p-channel MOSFET 82 and n-channel MOSFET 84, again with diodes, 83 and 85 respectively, in series with their drains.

Figure 4B:
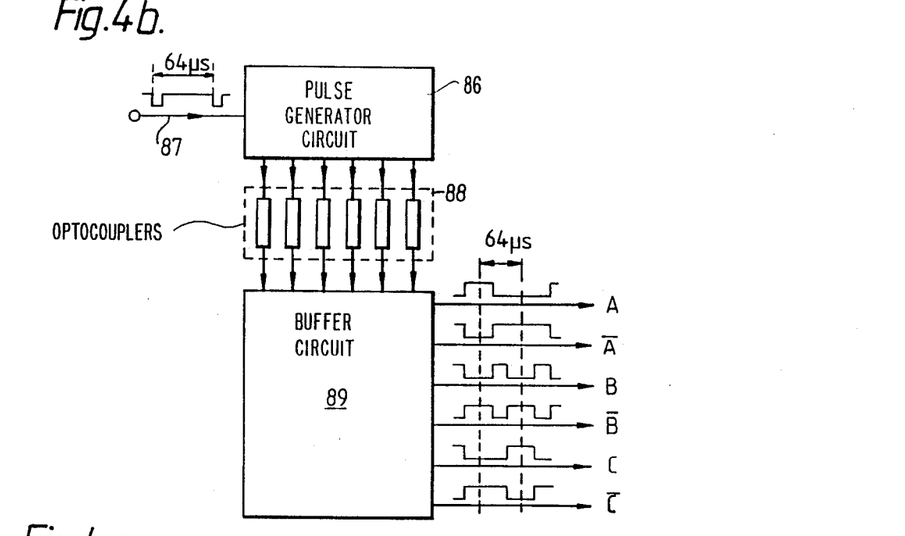

As shown in FIG. 4b, the gates (g) of the eight MOSFETs are supplied with controlling signal waveforms supplied by a pulse generating circuit 86 which is fed with a negative synchronizing pulse signal 87 of 64 μs repetition period derived from a video decoder. The pulse generator circuit 86 provides six different output waveforms at its outputs which are coupled through respective optocouplers 88 to a buffer circuit 89 which supplies the six signal waveforms, as illustrated and designated by the symbols A, B and C and their inverses $\overline{A}$, $\overline{B}$ and $\overline{C}$ in FIG. 4b, to the gates of the eight MOSFETs, the particular waveforms being received by each MOSFET gate being indicated in FIG. 4a by the adjacent symbol.

With these signal waveforms A, B, C, $\overline{A}$, $\overline{B}$ and $\overline{C}$, the switching bridge circuit operates to switch repetitively the voltages applied to each of the electrodes 38 and 40 between three voltage levels in the sequences shown by the respective adjacent illustrations in FIG. 4a. Although the voltage waveforms applied to the electrodes 38 and 40 follow the same sequence, they are applied in phase opposition. Thus, assuming for simplicity that the supply source 76 is at 0 volts and the sources 60 and 62 at respectively +50 V and −50 V relative thereto, the potential difference appearing between the electrodes 38 and 40 is switched from 100 V in one sense, then to 0 V, then to 100 V in the opposite sense, then to 0 V, then to 100 V in the one sense again and so on so as to cause the color lines displayed to follow the reversing color sequence RGBBGRRG etc. The duration of the periods for which the Red and Blue color is displayed is two times a single line scan period (21.3 μs) so as to enable two lines of those colors to be drawn consecutively. Green lines, of course are drawn singly. In view of the fact that the MOSFETs 78, 80, 82 and 84 are controlled by synchronized waveforms B and $\overline{B}$ as shown, it is ensured that the electrodes 38 and 40 are brought simultaneously to the mean (0 V) voltage.

A continuous color sequence operation can be readily achieved by suitably changing the output waveforms from the pulse generating circuit 86 leading to the pattern of potential difference between electrodes 38 and 40 illustrated in FIG. 3a.

The above described voltages for the sources 60, 62 and 76 serve to demonstrate the operation of the switching circuit. In actual practice, the color selection electrodes are maintained at typically a mean voltage of +250 V relative to the last dynode of the multiplier, i.e. at 2.5 kV relative to ground voltage (0 V). Consequently the voltages of the sources 60, 62 and 76 are held at, respectively, 2550 V, 2450 V and 2.5 kV. The switching bridge circuit is therefore a floating, three-level switching bridge circuit in which the color selection electrodes 38 and 40 are successively charged to +100 V, 0 V, −100 V relative to one another to achieve color selection while they are maintained at a mean potential of 2.5 kV.

The use of n- and p-channel MOSFETs 52,54,56 and 58 in a bridge configuration enables the deflection (color selection) voltages to be balanced about the electron potential.

The optocouplers 88 facilitate this floating and allow the MOSFET gate drive waveforms (A, $\overline{A}$, B, $\overline{B}$, C, $\overline{C}$) at different levels relative to one another and at 2.5 kV relative to ground to be provided without the risk of damage being caused to the signal generator 86 through the high voltage present in the circuit.

The provision of diodes 79, 81, 83 and 85 in series with the MOSFETs 78, 80, 82 and 84 connected to the 2.5 kV source 76 counteract the adverse effect of the intrinsic MOSFET reverse drain-source diodes. The complementary connection of the two pairs of n- and p-channel MOSFETs 78 and 80, and 82 and 84 to the 2.5 kV source 76 ensure the correct discharge of the color selection electrode capacitance to this voltage level from either direction.

Figure 6:
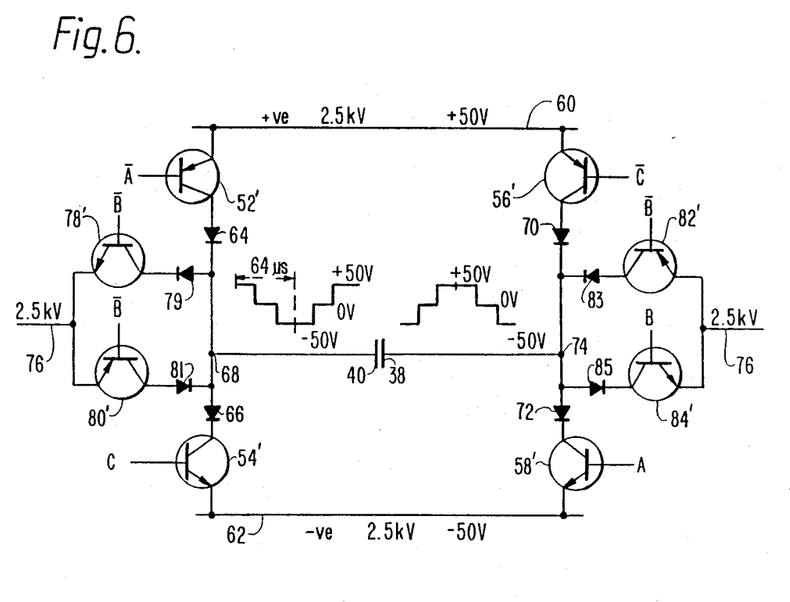
FIG. 6 shows an alternate embodiment of the circuit of FIG. 4a using bipolar transistors.

In an alternative form of the circuit as shown in FIG. 6, the p-channel MOSFETs respectively by pnp bipolar transistors 52' and 56' and npn bipolar transistors 54' and 58' with the emitters of the pnp bipolar transistors and npn bipolar transistors respectively connected to the voltage sources 60 and 62 and their collectors connected to the associated outputs 68 and 74. Similarly the MOSFETs 78 and 84 and 80 and 82 may also be replaced by pnp bipolar transistors 78' and 84' and npn bipolar transistors 80' and 82' connected as appropriate.

The circuit shown in FIG. 4a operates satisfactorily provided the pairs of color selection electrodes 38 and 40, and thus the multiplier's channels, are correctly aligned with the groups of stripes of differently colored phosphors of the screen, as shown in FIG. 2. However, in order to accommodate a situation in which the pairs of color selection electrodes are not correctly aligned with the screen structure a modified version of the circuit of FIG 4a may be employed. This modified circuit differs in that instead of each set of semiconductor switching devices of the switching bridge circuit sharing the same first, second and third voltage sources, namely 60, 62 and 76, each set is associated with its own respective and different first, second and third voltage sources. This enables a steady DC voltage to be added continuously between the electrodes 38 and 40 to correct for any constant misalignment in the lateral direction of the electrodes and the phosphor stripes, the value of the DC voltage being dependent on the extent of misalignment.

Figure 5:
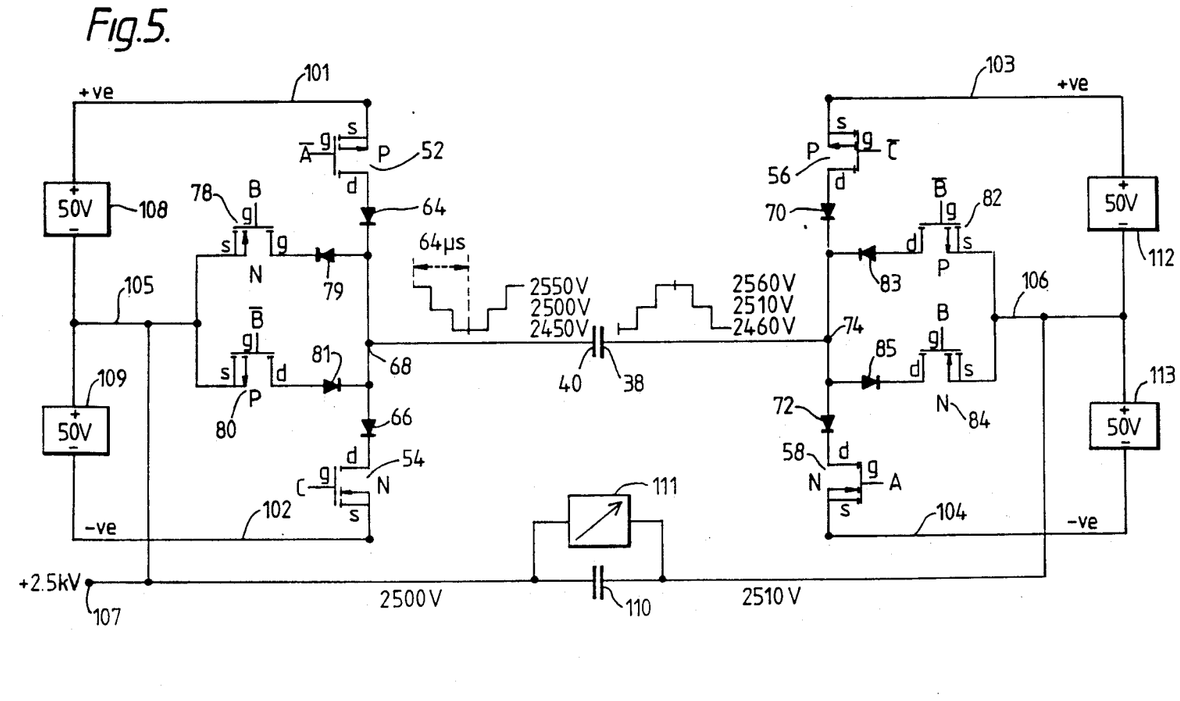
FIG. 5 shows schematically a modified form of part of the circuit of FIG. 4.

A suitably modified circuit for this purpose is shown in FIG. 5. In this figure, components identical with those in FIG. 4a are designated with the same reference numeral. Each set of series connected MOSFETs 52 and 54, and 56 and 58, respectively are connected between positive and negative voltage sources along lines 101, 102 and 103, 104, relative to an intermediate voltage source supplied along lines 105 and 106 to the parallel connected MOSFETs 78, 80 and 82, 84 associated with each set. A 2.5 kV supply source 107 is connected to line 105 and also to the junction between two series connected voltage supplies 108 and 109 whose outputs are coupled to the lines 101 and 102 respectively. The source 107 is also connected via a capacitor 110, having a capacitance considerably greater than that exhibited by the electrodes 38 and 40, in parallel with a statically shifting (positive or negative going) variable voltage supply 111 to the line 106 and also to the junction between two series connected voltage supplies 112 and 113 whose outputs are coupled to the lines 103 and 104 respectively. The circuit operates in much the same manner as that described with reference to FIG. 4a. However, by adjusting the variable voltage supply 111 the voltage levels appearing at lines 103, 104 and 106 can be offset with respect to those appearing at lines 101, 102 and 105 enabling an additional constant voltage difference between the electrodes 38 and 40 to be provided during switching. This results in a predetermined overall deflection of the beam to accommodate misalignment between the multiplier channels, and thus the electrodes 38 and 40, and the associated group of phosphor stripes of the screen with switching of the voltages applied to the electrodes 38 and 40 to achieve the potential differences necessary for color selection to still be maintained. By varying the voltage supply 111, the extent of this overall deflection can be correspondingly varied as required according to the degree of misalignment for which compensation is needed from a zero value in which, in effect, the circuit simulates the operation of the circuit of FIG. 4a.

To illustrate the operation of the circuit, typical voltages appearing in the circuit during its operation are indicated by way of example in FIG. 5. In this example, the voltage supplies 108, 109, 112 and 113 are 50 V supplies and the voltage supply 111 is adjusted so that the voltage appearing at line 106 is slightly positive with respect to that at line 105, i.e. at 2510 V. With the semiconductor switches operated in a manner identical with that described with reference to FIG. 4a, the respective resulting voltage waveforms appearing at electrodes 38 and 40 in operation are as indicated adjacent those electrodes. These waveforms are generally similar in nature to the corresponding waveforms in FIG. 4a except that the voltages given are the actual voltages which appear on the electrodes rather than being merely the superimposed (+50 V, 0 V, −50 V) voltages as used in FIG. 4a, and, as can be seen, those voltages associated with electrode 38 are offset by +10 V with respect to those associated with electrode 40. The potential difference between the electrodes 38 and 40 then switches between −90 V, +10 V, and +110 V.

We claim:

1. A color display system comprising a color display tube having multi-channel electrode means adjacent to a luminescent screen, the screen comprising a repeating pattern of three phosphor elements for luminescing in different colors respectively, the multi-channel electrode means providing at its output side an electron beam from each channel thereof in response to electrons being supplied to its input side, a pair of color selection electrodes associated with each channel of the multi-channel electrode means and disposed between an output side of the multi-channel electrode means and the luminescent screen which are operable to deflect an electron beam exiting from a channel of the multi-channel electrode means and by appropriate control of which the electron beam can be directed selectively onto each of a plurality of phosphor elements, and circuit means for selectively connected each of the color selection electrodes in each pair to three voltage levels, characterized in that the circuit means comprises a switching bridge circuit having two sets of two series-connected controlled semiconductor switching devices with a first end of each set connected to a source at a respective first voltage constituting a first voltage level and a second end of each set connected to a source at a respective second voltage constituting a second voltage level and with each set having an output intermediate the two semiconductor switching devices thereof connected to respective electrodes of each of the pairs of color selection electrodes, means for returning the voltages on the color selection electrodes to a respective intermediate third voltage level of a third voltage source, and signal generating means having outputs connected to the controlling electrodes of the semiconductor switching devices of both sets of two series-connected semiconductor switching devices for controlling switching of the devices, and hence, the voltage applied to the pairs of selection electrodes, in a predetermined sequence.

2. A color display system according to claim 1, characterized in that the semiconductor switching devices comprise field effect transistors.

3. A color display system according to claim 2, characterized in that the semiconductor switching devices of each set comprise an n-channel and a p-channel MOSFET whose sources are connected respectively to the respective first and second voltage sources and whose drains are connected to the output, with the waveforms of the signals supplied by the signal generating means to the control electrodes of the switching devices of one set being the inverse of the waveforms supplied to the control electrodes of the switching devices of the other set.

4. A color display system according to claim 1, characterized in that the semiconductor switching devices comprise bipolar transistors.

5. A color display system according to claim 4, characterized in that the semiconductor switching devices of each set comprise an npn and a pnp bipolar transistor whose emitters are connected respectively to the respective first and second voltage sources and whose collectors are connected to the output, with the waveforms of the signals supplied by the signal generating means to the control electrodes of the transistors of one set being the inverse of the waveforms supplied to the control electrodes of the transistors of the other set.

6. A color display system according to any one of the preceding claims, characterized in that the output of each set of the switching bridge circuit is connected also to the third source at the respective intermediate, third voltage level via at least one further controlled semiconductor switching device whose control electrode is connected to a further output of the signal generating means, the waveform of the signal supplied to control electrode of the said at least one further switching device associated with one set being synchronized with the waveform supplied to the control electrode of the at least one further switching device of the other set whereby the electrodes of each pair of color selection electrodes are brought simultaneously to their respective third voltage level.

7. A color display according to claim 6, characterized in that the output of each set of the switching bridge circuit is connected to the respective intermediate voltage source via an n-channel and a p-channel MOSFET connected in parallel whose control electrodes are connected to respective outputs of the signal generating means with the signal waveform supplied to one control electrode being the inverse of the signal waveform supplied to the other control electrode.

8. A color display system according to claim 7, characterized in that a respective diode is connected between each of the parallel connected MOSFETs and the output of the respective sets.

9. A color display system according to any one of claims 1-5, characterized in that the first, second and third voltage sources associated with each set of switching devices of the switching bridge circuit are the same.

10. A color display system according to any one of claims 1 to 5, characterized in that the first, second and third voltage sources associated with one set of the semiconductor switching devices of the switching bridge circuit are separate from those associated with the other set and in that the respective voltage sources associated with both sets are interconnected through a statically shifting variable voltage source providing an offset voltage to the voltage sources associated with one set.

11. A color display system according to any one of claims 1-5, characterized in that the outputs of the signal generating means are connected to the control electrodes of the semiconductor switching devices of the switching bridge circuit via optocouplers.

12. A color display system according to any one of claims 1-5, characterized in that the circuit means is arranged to switch the voltage applied to each one of the pair of selection electrodes between their respective three voltage levels in the sequence 1, 2, 3, 2, 1, 2, 3 . . . and so on where 1, 2 and 3 respectively designate the first voltage, the intermediate voltage, and the second voltage with the 1 and 3 voltage periods being double the 2 voltage period.

* * * * *